May 3, 1932. A. E. KNOWLES 1,856,218
ELECTROLYTIC APPARATUS
Filed March 30, 1931
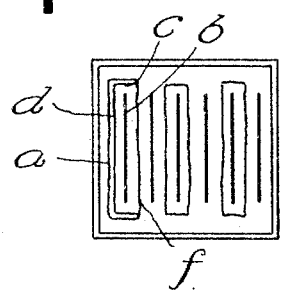
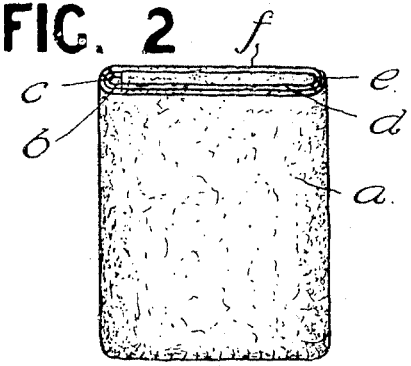
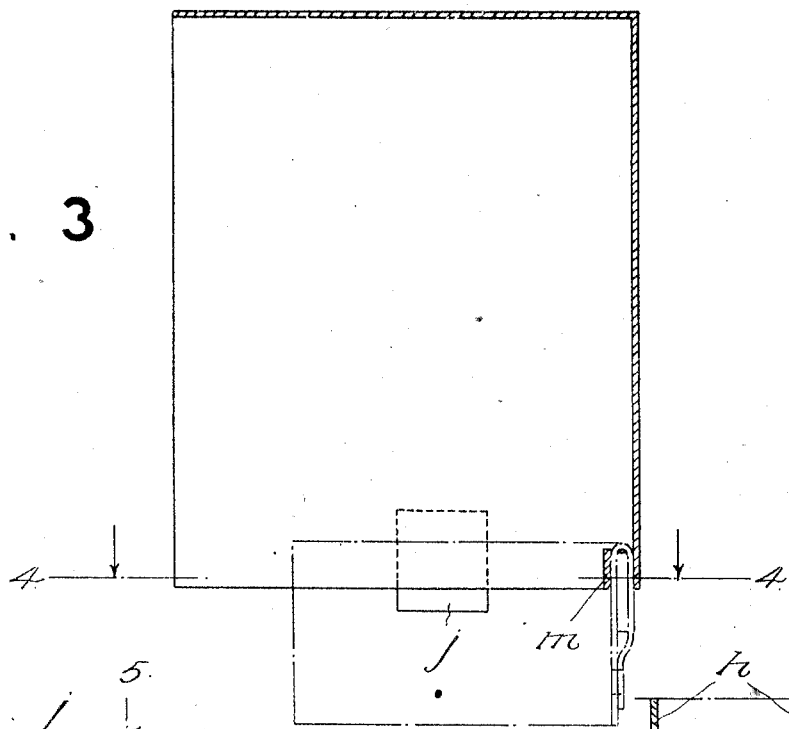
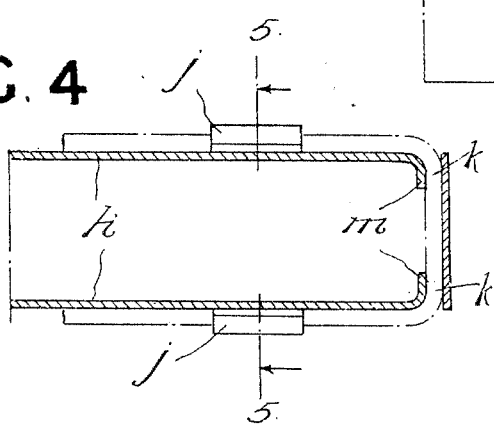
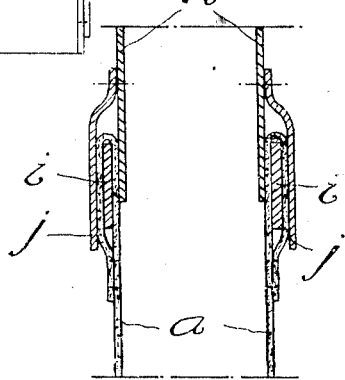
INVENTOR.
A. E. KNOWLES.

Patented May 3, 1932

1,856,218

UNITED STATES PATENT OFFICE

ALBERT EDGAR KNOWLES, OF HESWALL, ENGLAND

ELECTROLYTIC APPARATUS

Application filed March 30, 1931, Serial No. 526,210, and in Great Britain May 5, 1930.

In electrolytic apparatus for the production of gases by the decomposition of an electrolyte it is customary to enclose either the positive or negative electrodes in a sleeve, envelope, or bag of asbestos which depends from the gas collecting bell. By this means the gases in the electrolyte are kept separate from each other and collect in the respective bells in a high state of purity.

It has been found in practice that in multi-electrode cells, in which the number of electrodes is even, and thus whichever electrode is enclosed one of the enclosed plates will be adjacent to one or other of the end walls of the cell tank, difficulty is experienced in maintaining the purity of the gases.

By careful test, I have ascertained that in each case the bell of an enclosed plate situated adjacent a tank end is at fault and is collecting the impure gas.

The side of the end electrode which is toward the cell wall and does not face another and opposite electrode, releases for all practical purposes no gas; and it is possible that the impurity is caused by gas from other electrodes passing along the bottom of the tank, up the end wall, and into the space between the idle side of the electrode and its asbestos sleeve.

Whatever the cause may be, a mixture, with consequent lowering of the purity, does undoubtedly take place at the end electrode in these circumstances, which does not take place when the electrodes are uneven and an uncovered one is adjacent each end wall of the cell.

In order to remedy this defect, I provide an additional thickness on one side and at each end of the envelope or sleeve of such enclosed end electrode, whilst leaving the other side, which faces an opposite electrode, of normal thickness.

The accompanying drawings illustrate a sleeve in accordance with a preferred embodiment of the invention.

Figure 1 is a diagrammatic sectional plan view of a small cell showing alternate electrodes in the enclosing sleeves.

Figure 2 is a perspective view of an improved sleeve.

Figure 3 is a sectional view of the end portion of a gas bell showing one arrangement for attaching a sleeve.

Figure 4 is a sectional plan of Figure 3 on lines 4—4.

Figure 5 is a cross-section on lines 5—5 of Figure 4.

In the diagrammatic sectional plan of a cell, Figure 1, two electrodes are enclosed in ordinary asbestos sleeves and one electrode in my improved sleeve $a$.

In this embodiment the additional thickness in the sleeve is obtained in a one piece manufacture by overlapping more than half of the piece of material.

To form the sleeve $a$ I begin it with one end edge of the asbestos sheet at the line $b$ where an end of the sleeve merges normally into the side which is toward another electrode. The sheet is curved from this edge to form the end $c$ is carried along the side $d$ which will be toward the cell wall; is then recurved to form the opposite end $e$ and carried back parallel to the side $d$ to meet the first edge $b$ to form the inner side $f$. From this point it overlaps the first formed end $c$, is carried along the outer side $d$ to double that, is continued around the second end $e$ and terminates where this end merges in the inner side $f$. At the edges, the sheet is stitched, and at the bottom of the doubled side I prefer to "blanket stitch" or otherwise attach the lower edges of these double portions together as at $g$, Figure 2.

The sleeve or envelope $a$ may be attached to the bell $h$ in any suitable manner. I have usually secured a metal strip $i$ in a hem at each upper edge of the sides of the sleeves, and secured the sleeves to the lower edges of the bells by pressing the upper edges under clips $j$ or integral tongues formed by slitting the edges of the bells. At the end of the bell the sleeve may be secured by pressing its hem into a space $k$ formed between the end plate and two slitted and turned-in portions $m$ at the bottom of the bell sides, see Figures 3 and 4.

The improved sleeve with its doubled wall may be inserted by the same means and usually the clips have sufficient resilience to accommodate the thickened edge without needing any modification.

I claim:—

1. Electrolytic apparatus for the production of gases by the decomposition of an electrolyte comprising a cell containing electrolyte, electrodes of opposite polarity therein, gas collecting means above the electrodes, enclosures of material permeable by the electrolyte for, at least, alternate electrodes and an enclosure with sides of unequal thickness for the electrode which will be adjacent to a wall of the container, that side which is toward the wall being the greater.

2. Electrolyte apparatus for the production of gases by the decomposition of an electrolyte comprising a cell containing electrolyte, electrodes of opposite polarity therein, gas collecting means above the electrodes, enclosures of material permeable by the electrolyte for, at least, alternate electrodes and an enclosure with sides of unequal thickness for the electrode which will be adjacent to a wall of the container that side which is toward the wall as well as each end of this enclosure being of durable thickness of material.

3. Electrolytic apparatus for the production of gases by the decomposition of an electrolyte, comprising a cell containing electrolyte, electrodes of opposite polarity therein, gas collecting means above the electrodes and enclosures open at the bottom and connected to the bells at the top surrounding certain electrodes, the enclosure for an electrode which is adjacent to a wall of the cell being made of a length of material bent into an elliptical enclosure and overlapping itself so as to double the thickness of material on one side and two ends thereof, the doubled side being directed toward the cell wall.

4. An envelope for enclosing an electrode in electrolytic apparatus for the decomposition of an electrolyte and the production of gases comprising an enclosing curtain-like part for passing all around the electrode, means for suspending the curtain from a gas collecting bell placed over the electrode, an overlapping part on said curtain which doubles one side and both ends of the enclosure.

In testimony whereof I affix my signature.

ALBERT EDGAR KNOWLES.